Figure 2:
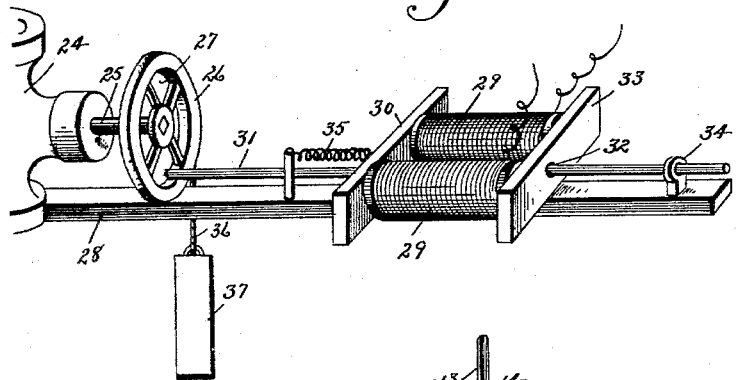

(No Model.)  2 Sheets—Sheet 1.
V. E. HUNTER.
AUTOMATIC STOPPING MECHANISM FOR ENGINES.
No. 597,198. Patented Jan. 11, 1898.
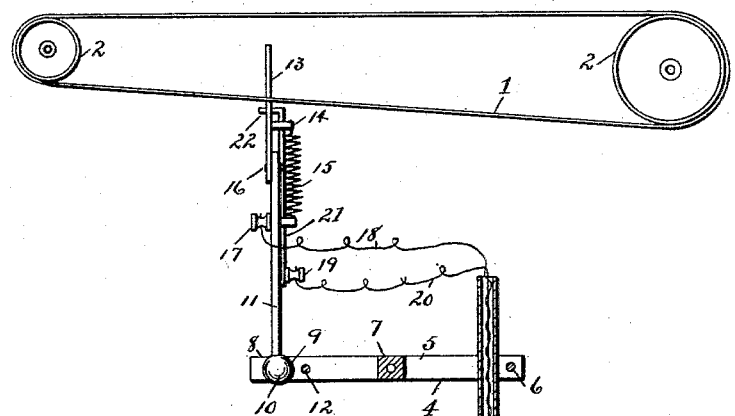
Fig. 1.
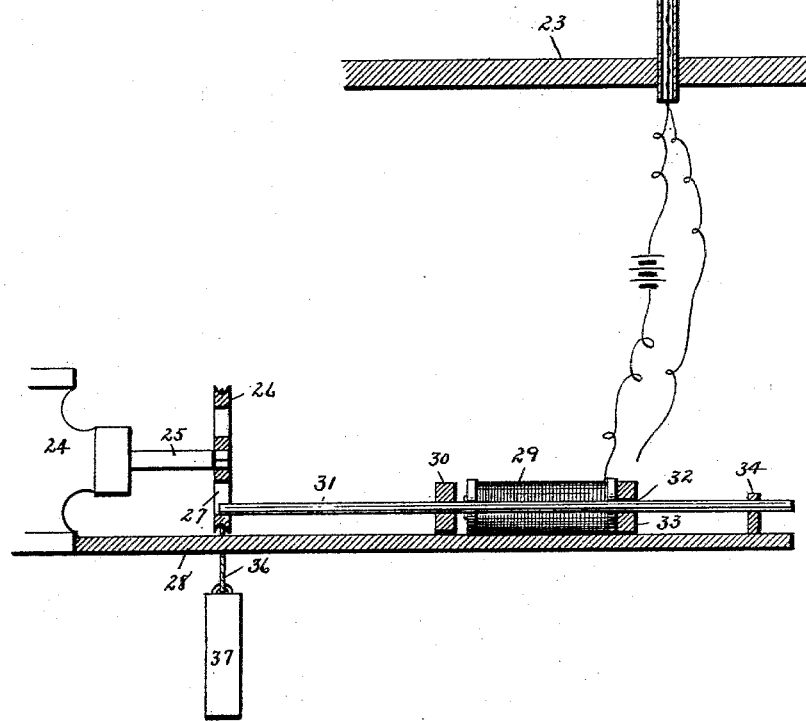
Witnesses
Lee J. Van Horn
Victor J. Evans
Inventor
Victor E. Hunter
By John Wedderburn
Attorney (No Model.) 2 Sheets—Sheet 2.

V. E. HUNTER.
AUTOMATIC STOPPING MECHANISM FOR ENGINES.

No. 597,198. Patented Jan. 11, 1898.

Witnesses
Lee J. VanHorn.
Victor J. Evans.

Inventor
Victor E. Hunter,
by John Wedderburn
Attorney

UNITED STATES PATENT OFFICE.

VICTOR EMMET HUNTER, OF CLEBURNE, TEXAS, ASSIGNOR OF ONE-HALF TO JACOB D. OLIGER, OF SAME PLACE.

AUTOMATIC STOPPING MECHANISM FOR ENGINES.

SPECIFICATION forming part of Letters Patent No. 597,198, dated January 11, 1898.

Application filed June 24, 1897. Serial No. 642,158. (No model.)

*To all whom it may concern:*

Be it known that I, VICTOR EMMET HUNTER, of Cleburne, in the county of Johnson and State of Texas, have invented certain new and useful Improvements in Automatic Stopping Mechanism for Engines; and I do hereby declare the following to be a full, clear, and exact description of the invention, such as will enable others skilled in the art to which it appertains to make and use the same.

This invention relates to mechanism for automatically stopping engines and the like; and the object in view is to provide means adapted to coöperate with a moving belt, so that in the event of the belt becoming partially or wholly displaced from its pulleys the mechanism will operate to close the throttle-valve, thereby shutting off the supply-steam to the engine and causing a stoppage of the latter.

With this end in view the invention consists in certain novel features and details of construction and arrangement of parts, as hereinafter fully described, illustrated in the drawings, and incorporated in the claims hereto appended.

Figure 3:
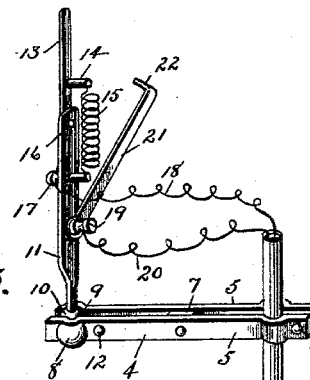

In the accompanying drawings, Figure 1 is a sectional view showing the entire mechanism for stopping the engine. Fig. 2 is a detail perspective view showing the electromagnet, armature, and a portion of the throttle-valve, casing, or steam-chest, and the means for releasing the valve-closing mechanism. Fig. 3 is a detail perspective view of the trip mechanism.

Similar numerals of reference designate corresponding parts in all the views.

For the purpose of illustrating the present invention I have shown an ordinary driving-belt 1 running around pulleys 2. The improved mechanism embodies, essentially, a support 3, which is preferably tubular, being in the form of an upright pipe, and mounted upon this support is a bracket 4, consisting of opposing plates or members 5, bent to embrace the support 3 and adapted to be clamped thereon by means of transverse bolts or other suitable fasteners 6. One of the members 5 is provided with a spacing-lug 7 to gage the distance between said members, and at their outer ends the members are provided with oppositely-located and outwardly-projecting offsets 8, forming a hemispheroidal cavity or socket 9, in which is received the ball-head 10 of a vibratory arm 11.

12 designates a tension bolt or screw for adjusting the frictional bearing of the members 5 upon the arm 11, so as to hold said arm with a certain amount of resistance in any desired position.

Connected pivotally to the upper end of the arm 11 is a trip 13, having a laterally-projecting arm 14, to which is connected one end of a coil-spring 15, the opposite end of which connects to a fixed point on the arm 11, located at one side of the pivot 16, so that when the trip 13 is moved in either direction it will be held in such position by means of the spring 15. Connected to the arm 11 is a binding-post 17, to which one of the line-wires 18 is connected. Connected to the opposite side of the arm 11, which is of some non-conducting material, such as wood, is a second binding-post 19, to which the remaining line or circuit wire 20 is secured. Extending away from the binding-post 19 and in electrical connection therewith is an arm 21, the upper end 22 of which is arranged in the path of the trip 13, so that when said trip is thrown against the arm 21 an electrical circuit will be completed through the wires 18 and 20, binding-posts 17 and 19, spring 15, arm 14, trip 13, and arm 21. The circuit-wires 18 and 20 extend downward through the pipe 3 and through the floor 23 into another compartment, where the engine is arranged.

24 designates a portion of the valve-casing or steam-chest of the engine, and 25 the valve-stem, which is rotatable and provided with a disk or wheel 26, having one or more openings 27. Secured to the part 24 is an arm or bracket 28 of sufficient length to support an electromagnet 29. The armature 30 of the magnet carries a slide-rod 31, the extremity of which is adapted to enter in one of the openings 27 in the disk or wheel 26. The rod 31 is extended to slide through a guide-opening 32 in the yoke 33 of the electromagnet 29, said rod also extending through an additional guide or bearing 34 on the outer end of the arm 28.

35 designates a spring for moving the slide-rod 31 into engagement with the wheel or disk 26, said spring being interposed between the armature and a fixed point on the arm 28. The wheel or disk 26 has a grooved rim and constitutes a drum, upon which is wound a cord or other flexible device 36, having at its end a weight 37 of sufficient size to rotate the valve-stem and close the throttle-valve.

In operation the belt, by shifting partially or wholly off its pulley, comes in contact with the trip 13. This moves into contact with the arm 31 and closes the circuit. The effect of this is to attract the armature 30 and thereby withdraw the rod 31 from engagement with the wheel 26. This allows the wheel to rotate under the influence of the weight 37, thereby closing the throttle-valve and stopping the engine. The same result would follow in the event of the pulley itself becoming loose and shifting.

It will of course be understood that the device is susceptible of changes in the form, proportion, and minor details of construction, which may accordingly be resorted to without departing from the principle or sacrificing any of the advantages of the invention.

Having thus described the invention, what is claimed as new, and desired to be secured by Letters Patent, is—

1. The combination of a throttle-valve having a rotatable stem and a disk or wheel thereon, a cord and weight connected to said wheel for rotating it and closing the throttle-valve, an electromagnet, an armature therefor, a slide-rod connected to said armature and adapted to engage and hold the wheel on the throttle-valve stem, a belt, and means contiguous to said belt for completing the electrical circuit in which the magnet is located, when the belt is shifted, substantially as described.

2. The combination of a driving-belt, an arm movable with relation to said belt, a trip pivotally connected thereto, an arm or contact-plate arranged near and in the path of said trip, an electrical circuit in which said arm or contact-plate and trip are located, an electromagnet in the circuit, an armature, and a rod or projection carried by the armature and adapted to engage with the stem of a throttle-valve, substantially in the manner and for the purpose specified.

3. The combination with a tubular support forming a conduit for circuit-wires, of a bracket adjustably mounted on said support, an arm fulcrumed thereon and arranged contiguous to a driving-belt, a trip pivotally mounted on said arm, a spring for holding said trip in a certain position, a contact-plate or arm arranged in the path of said trip and located together with the trip in an electrical circuit, a throttle-valve having a weight-actuated stem which normally operates to close the valve, an electromagnet in the circuit, and an armature carrying a rod or projection adapted to hold the stem of the valve against rotation under normal condition and when attracted by the magnet to release said stem, thereby closing the valve, substantially as described.

In testimony whereof I have signed this specification in the presence of two subscribing witnesses.

VICTOR EMMET HUNTER.

Witnesses:
E. A. RICE,
P. T. LOMAS.